May 1, 1962    I. M. KOLLAR ETAL    3,032,249
TUBULAR COOKING CONTAINER
Filed Nov. 18, 1960
FIG.1
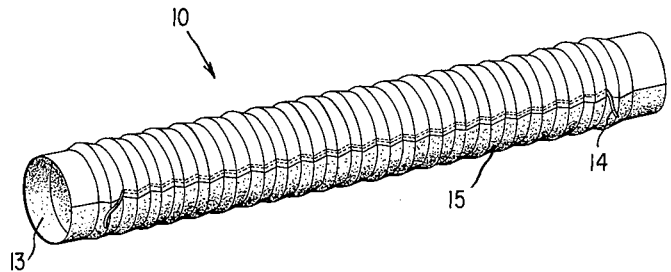
FIG.2
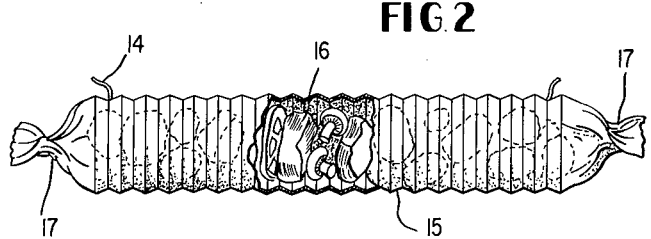
FIG.3
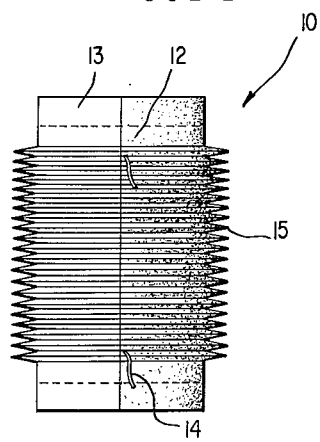
FIG.4
FIG.5
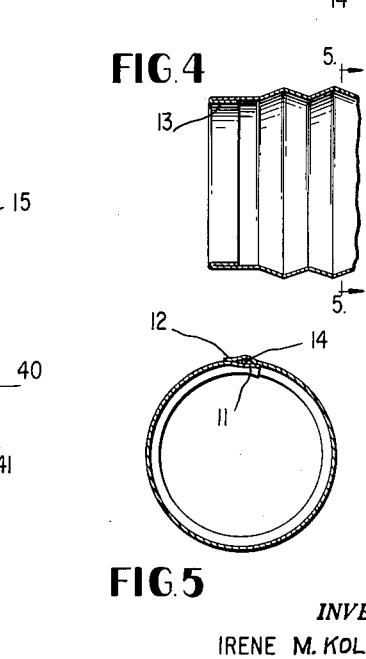
FIG.6    FIG.7
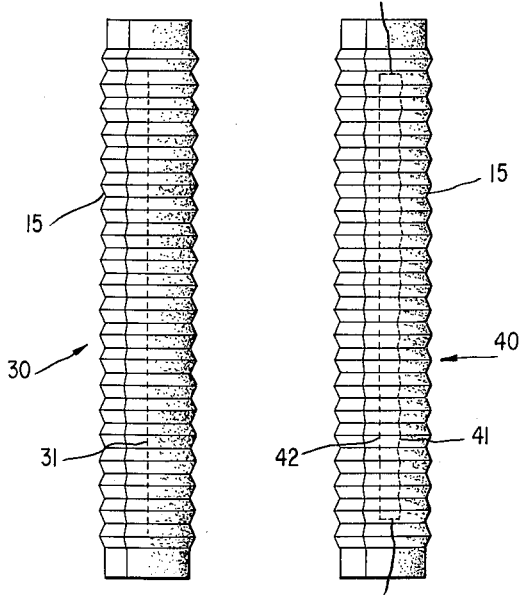
INVENTORS
IRENE M. KOLLAR
CATHERINE J. ANDERSON

United States Patent Office 3,032,249
Patented May 1, 1962

3,032,249
TUBULAR COOKING CONTAINER
Irene M. Kollar, 3114 Wisconsin Ave. NW., and Catherine J. Anderson, 310 4th St. SE., both of Washington, D.C.
Filed Nov. 18, 1960, Ser. No. 70,188
1 Claim. (Cl. 229—3.5)

This invention relates to new and useful improvements in cooking utensils and more particularly to a disposable tubular cooking container especially adapted to outdoor cookery.

With the present popularity of outdoor cooking, camping, and the like, a great need has developed for a small, relatively inexpensive, disposable container in which the smaller types of meats and vegetables can be cooked along with their juices or special sauces to enhance the flavor of food prepared outdoors. The use of pots or other large metal containers is often an annoyance due to their size and the fact that they must be cleaned shortly after use. The metal foil container disclosed herein will greatly enhance the flavor and texture of food prepared outdoors with special emphasis on the smaller types of meats and vegetables which hitherto did not lend themselves to open-fire, direct heat because of their delicate nature, or which were impractical for placement on a skewer or spit.

It is an object of the present invention to provide a disposable cooking container which is light in weight, inexpensive to manufacture, and which is adjustable as to size.

Another important object of this invention is to provide a cooking utensil which is disposable that will protect the moisture, texture, and flavor of foods cooked over an open fire by eliminating the drying tendency of direct heat, and to allow for more thorough application of condiments and sauces to these foods.

A still further object of the present invention is to permit advance preparation of outdoor meals by providing a container in which foods may be frozen and then taken to a campsite, picknic or the like, thus preventing the possibility of spoilage en route.

Another object of this invention is to provide a disposable cooking container which will eliminate the need of serving plates by permitting the contents to be eaten directly therefrom.

A still further object of the invention is to provide a cooking container which may be collapsed to a very small size for storage or sale and later, before use, extended to any desired size to accommodate the food to be prepared therein.

Another object of the present invention is to provide a cooking container which may be tightly sealed around the food to be prepared but which may be readily opened to permit access to the food.

Other objects of the invention are to provide a disposable cooking container bearing the above objects in mind which is of simple construction, is inexpensive to manufacture, and is at all times efficient, reliable, and safe in use.

For other objects and for a better understanding of the invention, reference may be had to the following detailed description taken in conjunction with the accompanying drawing in which:

FIGURE 1 is a perspective view of a preferred embodiment of the present invention showing the tubular container extended and ready to receive food;

FIGURE 2 is a side elevational view of the container with a portion thereof broken away to show food items contained therein;

FIGURE 3 is a plan view of the container in a collapsed condition;

FIGURE 4 is a sectional view of one end portion of the container in expanded condition;

FIGURE 5 is a vertical sectional view of the container taken along the line 5—5 of FIGURE 4;

FIGURE 6 is a plan view of a modified form of the container; and

FIGURE 7 is a plan view of still another modified form of container.

Reference is now made more specifically to the drawing, wherein like numerals designate similar parts throughout the several views and wherein the tubular cooking container constituting the subject matter of this invention is designated generally at 10.

The utensil will be preferably constructed from a rectangular sheet of heavy grade metal foil. Aluminum foil has been found to be most practical due to its availability and properties which render it safe for cooking purposes. Further aluminum foil is practical for machine crimping or pleating, and is maleable enough to allow the container ends to be easily twisted by hand. The two ends 11 and 12 of the rectangular sheet are brought together and then overlapped and sealed. (See FIG. 5). In order to provide additional strength at the end portions of the container, the sides of the sheet may be folded in upon themselves to form a double thickness for a short distance as at 13 before the rectangular sheet is formed into a tube.

In the preferred form of the invention a metal or fiber tear string 14 is placed within the area of overlap of the ends 11 and 12 and extends along the length of the resulting tubular container. It should be noticed, however, that the ends of the tear string pass through small apertures and extend outwardly of the outer surface of the container approximately one inch from either end, for a purpose to be described later.

In order to permit the tubular container to be extended and compressed, the aluminum foil is provided with accordian pleats 15 for a major portion of its length. These pleats may be made by any process desired either before the rectangular sheet is formed into the cylinder or after the sealed cylinder has been formed. Due to the inherent maleability of aluminum foil, machine crimping or pleating may be employed in the manner of forming Japanese lanterns. In the alternative the cylindrical container may be placed on an expandible mandrel and the pleats formed therein by a pressure die. Any method of forming the pleats may be resorted to which will permit the finished cylinder to be collapsed into small space as shown in FIGURE 1. It will be apparent that these pleats or folds serve another purpose in the finished article, that is they serve as small valleys for retaining juices and sauces during the cooking process, and therefore even if the tubular container is placed on the fire at a slight angle to the horizontal, the juices will remain within the depressions or valleys formed by the pleats 15 and will not pour down to one end.

Food, such as small pieces of meat, onions, tomatoes, etc., 16, is placed within the fully extended container and then the container ends are twisted by hand as at 17 forming a tightly closed fluid tight cooking container. In this condition the loaded container may be frozen or immediately placed on an open fire.

When the contents have been cooked the desired amount, the tear string 14 may be sharply pulled along the longitudinal axis of the cylinder which will quickly produce a rip along the container wall and permit access to the interior thereof. Starting the tear string a short distance in from either end enables ripping the container open without interfering with the sealed ends 17 which could cause leakage. While the tear string 14 is illustrated as emplaced between the overlapping sealed ends 11 and 12 of the foil sheet, it is obvious that the string could just as well be placed at any other position around the periphery of the tubular container if desired.

FIGURE 6 illustrates a modification of the tubular container indicated generally at 30. This container differs from the embodiment of FIGURE 1 in that the tear string is not present. In place of the tear string a series of score lines 31 have been embossed or otherwise impressed along a major portion of the length of the cylinder. When it is desired to open the container, a knife, fingernail, or other sharp implement may be quickly run down the row of score line resulting in the formation of a slit permitting entry to the interior of the container.

FIGURE 7 represents an even further modification of the cooking container. In this figure the container, represented generally at 40, has two parallel rows of score marks or lines 41 and 42 which may be spaced apart about one-quarter of an inch. The ends of these rows which are spaced inwardly from the container ends have score lines 43 and 44 bridging the two rows defining a tear strip. With this construction the score lines 43 or 44 may be cut with the fingernail leaving a tab portion of foil which may be readily grasped between the thumb and finger and pulled along the length of the container wherein the strip portion enclosed by the score lines 41, 42, 43, and 44 will be pulled off leaving an access opening in the container.

Either one of the containers illustrated may be used to serve food after it has been cooked eliminating the need for dishes. After the container has been slit open the sides may be pulled apart slightly so that the container resembles a canoe in shape and a fork or spoon may then be inserted with ease to allow eating directly from the container.

The tubular food containers above described could be purchased in packages of say 50 units which would be in the collapsed condition of FIGURE 3 which is conducive to storage in a small space. When needed for use, the individual containers may easily be extended by hand to a length of preferably twelve inches and a diameter of about one and one-half inches. The ends of the tube being open, the chef may insert a variety of foods, sauces and condiments therein, and then either twist or fold the ends 17. If desired the foods may be frozen in these containers and stored for an indefinite period of time until ready for use.

They may, if desired be carried to a picnic or campsite in frozen condition and allowed to thaw at the site wherein freshness of the contents can be assured. In order to cook the contents it is only necessary to place the container on the open fire or grill. This will allow the foods to cook in their own juices or in any sauce or marinade that has been placed within the container and eliminate the drying element of direct heat. If desired, the food may be only partially cooked in the tubular container to absorb the sauces as in preparation of "Shishkabob," then a regular skewer may be run through the length of the foil tube, and the tube discarded. This would make for a more complete cooking of such foods as onions, potatoes and tomatoes, which are sometimes left with raw centers by regular skewer cooking.

While we have shown and described a preferred embodiment and two modifications of the invention, it is to be understood that the drawings and detailed disclosure are to be construed in an illustrative rather than a limiting sense since various other modifications and substitutions of equivalents may be made by those skilled in the art within the spirit and scope of the invention as defined in the appended claim.

What we claim as new and desire to protect by Letters Patent of the United States is:

A tubular cooking container comprising an open ended cylinder formed of metal foil, said cylinder having end portions turned in to provide a double foil thickness at both ends of said open ended cylinder, said end portions being adapted to be twisted by the user to fully enclose the contents thereof, said cylinder being accordian pleated transversely of the longitudinal axis thereof in an area spaced inwardly from each of said end portions to allow said cylinder to be extended or compressed manually, and tear means extending along the length of said cylinder.

References Cited in the file of this patent
UNITED STATES PATENTS

| | | |
|---|---|---|
| 1,782,526 | Beardsley | Nov. 25, 1930 |
| 2,097,858 | Herz | Nov. 2, 1937 |
| 2,306,335 | Feigenbutz | Dec. 22, 1942 |
| 2,364,943 | Brandt | Dec. 12, 1944 |
| 2,685,316 | Krasno | Aug. 3, 1954 |
| 2,780,378 | Romano | Feb. 5, 1957 |
| 2,912,336 | Perino | Nov. 10, 1959 |